(12) United States Patent
McAllister

(10) Patent No.: US 11,442,345 B2
(45) Date of Patent: Sep. 13, 2022

(54) SUSPENSION SYSTEM FOR ADJUSTING PROJECTED LIGHT IMAGES

(71) Applicant: Skyphos Industries, Inc., Blacksburg, VA (US)

(72) Inventor: Walter McAllister, Blacksburg, VA (US)

(73) Assignee: Skyphos Industries Inc., Roanoke, VA (US)

(*) Notice: Subject to any disclaimer, the term of this patent is extended or adjusted under 35 U.S.C. 154(b) by 0 days.

(21) Appl. No.: 17/277,540

(22) PCT Filed: Sep. 18, 2019

(86) PCT No.: PCT/US2019/051797
§ 371 (c)(1),
(2) Date: Mar. 18, 2021

(87) PCT Pub. No.: WO2020/061238
PCT Pub. Date: Mar. 26, 2020

(65) Prior Publication Data
US 2022/0035228 A1 Feb. 3, 2022

Related U.S. Application Data

(60) Provisional application No. 62/732,841, filed on Sep. 18, 2018.

(51) Int. Cl.
*G03B 21/14* (2006.01)
*G03B 21/20* (2006.01)
*G03B 21/00* (2006.01)

(52) U.S. Cl.
CPC ......... *G03B 21/142* (2013.01); *G03B 21/008* (2013.01); *G03B 21/147* (2013.01)

(58) Field of Classification Search
CPC ...... G03G 21/00; G03G 21/14; G03G 21/142; G03G 21/147; G03G 21/008; B33Y 30/00; G02B 27/66
(Continued)

(56) References Cited

U.S. PATENT DOCUMENTS 8,454,174 B2 * 6/2013 Nakano .................. F16M 13/02
248/176.1
9,229,300 B2 * 1/2016 Hellin .................. G03B 21/142
(Continued)

OTHER PUBLICATIONS

Application No. PCT/US2019/051797, International Search Report and Written Opinion dated Jan. 2, 2020.

*Primary Examiner* — William C. Dowling
(74) *Attorney, Agent, or Firm* — Woods Rogers PLC; Nathan A. Evans

(57) ABSTRACT

A suspension system including a set of optics which adjust the size and focus of the projection image originating at a Digital Micro-Mirror Device mirror set. The suspension and adjustment system for these optics may be mounted between the Digital Micro-Mirror Device housing and the optics carrier. This system has the capability to both adjust the resulting size and focus of the image at the same distance to a wall, as well as adjust for out-of-plane issues which often result in skewed images. This results in an adjustable focal and image size differing from the manufacturer's intended throw pattern and allowing broader use of the projector to make smaller images at the same throw distance.

19 Claims, 16 Drawing Sheets

(58) Field of Classification Search
USPC .................................................. 353/79, 119
See application file for complete search history.

(56) References Cited

U.S. PATENT DOCUMENTS

| | | |
|---|---|---|
| 2006/0146298 A1 | 6/2006 | Lin |
| 2007/0103432 A1 | 5/2007 | Yee et al. |
| 2008/0055561 A1 | 3/2008 | Lv et al. |
| 2008/0158523 A1 | 7/2008 | Jackson et al. |
| 2011/0196529 A1 | 8/2011 | Shkolnik et al. |
| 2012/0069304 A1 | 3/2012 | Kanazawa |
| 2013/0070223 A1 | 3/2013 | Peijster et al. |
| 2013/0120720 A1 | 5/2013 | Hellin et al. |
| 2014/0192332 A1* | 7/2014 | Koyama ............ F16M 11/2057 353/119 |
| 2015/0212398 A1* | 7/2015 | Lam .................... F16M 13/027 353/119 |
| 2017/0157862 A1 | 6/2017 | Bauer |

* cited by examiner

Assembly of outer lens attachment for suspension system.

Split ring design, used for rear-mount to standard projector lens assembly on off-the-shelf projector. Showing assembly and installation.

Suspension system assembled outside of projector, dry-fit and final fit to allow focal adjustment from 0.1 um to 200 mm

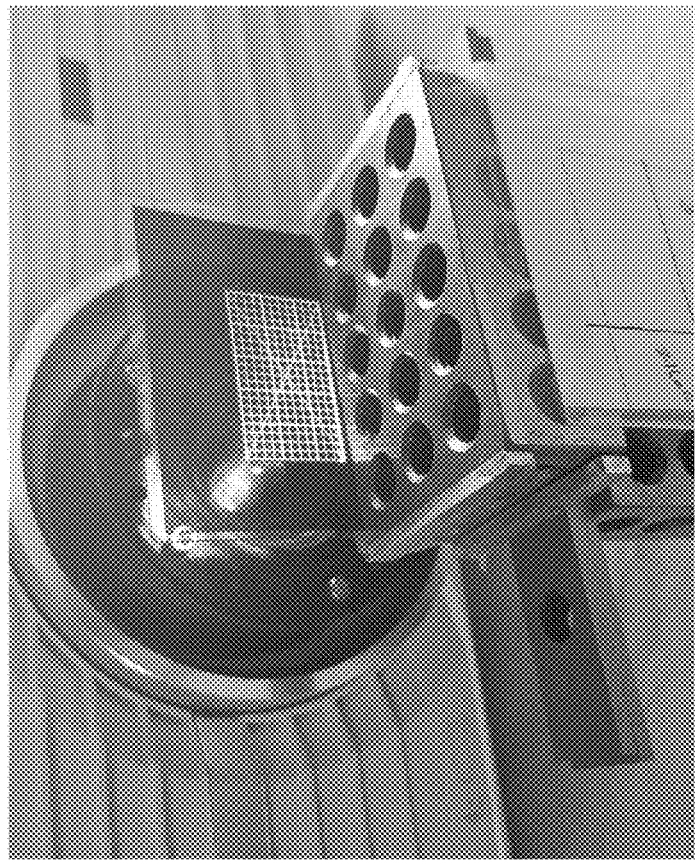
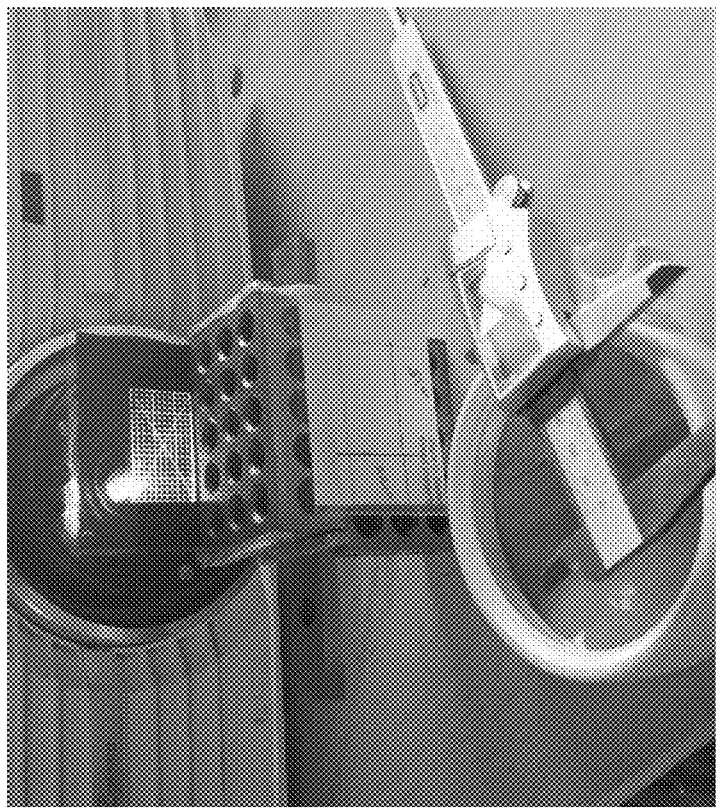
FIG. 13
Picture illustrating 10 um resolution from standard projector.

Example chip: Open top device, printed at 10 um resolution, 0.5 um via through 1.3 mm height device, 50 um channel height.

Example section from non-capped 3D printed microfluidic device, 20 um pillars x 200 um tall, offset at 10 um 80 um spacing – printed in 4x exposure without moving stage.

SUSPENSION SYSTEM FOR ADJUSTING PROJECTED LIGHT IMAGES

CROSS-REFERENCE

The present application is a U.S. National Stage Application of PCT/US2019/051797, filed Sep. 18, 2019, which relies on the disclosures of and claims priority to and the benefit of the filing date of U.S. Provisional Application No. 62/732,841, filed Sep. 18, 2018. The disclosures of those applications are hereby incorporated by reference herein in their entireties.

BACKGROUND

Field of the Invention

In aspects, an apparatus is provided for: improving image quality; correcting image artifacts, including "keystone" effects; centering an optic over a projection beam to, among other things, reduce asymmetries or barrel distortion; and/or controlling and expanding the operating range of pixel pitch over "throw distance" in DLP (digital light projection) and LCD (liquid crystal display) projection systems. In other aspects, the present invention is directed toward vat polymerization of 3D printing systems, (DLP, SLA, LCD), as well as powder bed methods and aerosol jet style systems.

Description of the Related Art

The present invention relates to an optical suspension and adjustment system for a projector, like those found for home entertainment or presentation use. For example, DLP, LCD, and other types of projectors are generally used to display images, movies, presentations, artwork, and also can be used for lithograpy, maskless-lithography (aka, 3D printing), freeform and in 3D printing, 3D-DLP, etc., when proper image aspect, sizing and scaling are important for enjoyment and professionalism. In the case of different presentation spaces, such as arenas with limited projection space, sometimes the projected image from the manufacturer's device will not fit inside the limits of a screen area. This results in an overspill of the image outside of the screen edges, limiting enjoyment or accurate depictions of images, and in the case of printing systems can produce improper prints by size or skewed resolutions; further, these inconsistencies can produce improper tolerances for 3DP. For example, to project an image on a wall in a small room like a dorm or bedroom, the throw distance for many projectors is larger than the preferred distance across a room. In this case, the image may wrap around onto other areas and walls of the room, causing mixed aspect and image skews. In another example, the viewer may have a small area where they can project the image without having the image run over onto a piece of furniture, door or window frame, or wall hangings. These examples show how a reduction of image quality may be due to limitations placed on the viewer by the viewing environment. This can lead to eye strain and reduced enjoyment.

In a further example, many home-use-projectors, which are also the kinds of projectors used for 3D printing with UV resins, also known as vat polymerization systems. The limitation of focus-distance and size of pixels as displayed on either the transparent window, in a bottom-up system, or projected on the top layer of resin, in a top-down system, plays a role in the highest resolution possible for printing minimal feature sizes for 3D printers.

Specifically regarding 3D printing systems—in the case of bottom up style 3D DLP systems the projector final lens will rest on the vat surface, in a top-down system the lens would be in contact with the resin inside the vat. For LCD systems—there is no focal lens, the vat instead rests directly upon the LCD Screen—a further reducing optic(s) must be installed to reduce the pixel aspect beyond the native size (at the time of the application approximately 50 um). Regarding laser-based SLA systems specifically, and outside of projectors, the problem is that a single lens which cannot be used to tune the laser spot size is employed and thus limits all print resolution to the cross section area of the laser as incident on the vat or liquid surface—this can extend print times if the laser spot size is reduced, or limit accuracy and minimal feature size if it is enarged. Pixel pitch, the distance across either edge of a pixel at point of polymerization, is generally accepted for all off-the-shelf projectors to be near a 50 µm range limit in distance. While claims from 3D printer companies market this ultimate pitch distance as the minimal feature size resolution, many in the field contend the true resolution is closer to two to three times the pixel width. This statement has been proven empirically in many papers.[1,2,3,4,5] Regardless of which opinion is correct, many users wish to have a smaller pixel dimension to enable Hi-Res prints and smoother transitions between layers and within the layers themselves. The reason for this can be seen in an example from jewelry manufacturing where a castable resin is used to create a model of an artist's 3D drawing from a suitable casting polymer resin. Once the model is cured, it is placed in a casting device, in most cases employing a centrifugal method to introduce melted rare metals like gold, silver, platinum, etc., via a tube or conduit to the model. The model is "burned out" via the molten metal as it fills the cavity. The polymer model

[1] Rogers, C. I., Qaderi, K., Woolley, A. T., & Nordin, G. P. (2015). 3D printed microfluidic devices with integrated valves. *Biomicrofluidics*, 9(1), 016501. http://doi.org/10.1063/1.4905840

[2] Beauchamp, M. J., Nordin, G. P., & Woolley, A. T. (2017). Moving From Millifluidic to Truly Microfluidic Sub 100 µm Cross-Section 3D Printed Devices. *Analytical and Bioanalytical Chemistry*, 409(18), 4311-4319. http://doi.org/10.1007/s00216-017-0398-3

[3] Chen, C., Mehl, B. T., Munshi, A. S., Townsend, A. D., Spence, D. M., & Martin, R. S. (2016). 3D-printed Microfluidic Devices: Fabrication, Advantages and Limitations—a Mini Review. *Analytical Methods: Advancing Methods and Applications*, 8(31), 6005-6012. http://doi.org/10.1039/C6AY01671E

[4] Bhattacharjee, N., Urrios, A., Kang, S., & Folch, A. (2016). The upcoming 3D-printing revolution in microfluidics. *Lab on a Chip*, 16(10), 1720-1742. http://doi.org/10.1039/c61c00163g

[5] Urrios, A., Parra-Cabrera, C., Bhattacharjee, N., Gonzalez-Suarez, A. M., Rigat-Brugarolas, L. G., Nallapatti, U., . . . Folch, A. (2016). 3D-PRINTING OF TRANSPARENT BIO-MICROFLUIDIC DEVICES IN PEG-DA. *Lab on a Chip*, 16(12), 2287-2294. http://doi.org/10.1039/c61c00153j is then vaporized out. The end result is a casting of the original model shape. Any remnants on the casting are ground and polished off by hand, or in a tumbling machine. (The grindings are too small to be recovered.) As rare metals like those mentioned above are expensive, a mold as close to a final product to reduce these finishing steps is preferred and reduces the cost associated with unrecovered metal and further re-work. Smaller pixels, enabling a higher resolution, would markedly reduce these final steps, post-processing time and wasted product (e.g., metal).

In two final examples, reductions in pixel pitch are preferred in uSLA-DLP 3D printers. DLP-uSLA 3D devices are described as those with pixel pitches below 50 um to the limit of light governed by the diffraction of light and optics and throughly described in optical phenomena of ray optics and wave optics. The first example described herein is in the fabrication of MEMS and/or microfluidic devices. MEMS stands for micro-electro-mechanical-systems. In this particular field, researchers develop extremely small mechanics and electric portions from polymers, metals, metaloids, and ceramics, to perform functions, measurements, and experiments, energy harvesting, sensor construction, etc. By way of non-limiting example, their uses include: energy-harvesting devices built to collect remnant environmental energies and convert them back to electrical power, optical waveguides to allow computers to run faster, and micro-chromotography systems like those used by Zebra (Virginia Tech, Masoud Agah).

In a similar branch of science, microfluidics requires devices with extremely smooth walls (below 1 um) and channels (e.g., below 50 um wide), and in some cases artifacts are only acceptable if they are near the single micron size range. These microfludic devices, biochips, microarrays, and microfluidic chips are used to analyze small amounts of biologicals from RNA, DNA, proteins, viruses, bacteria, plant cells, mammalian cells, and the components of the above, by way of example. Microfluidics has enabled several point-of-care devices which alter healthcare and well-being of the patient—from near immediate results, to reduced cost and time to treatment, examples exist from pregnancy tests, multi-resistant bacterial strains, glucose monitoring, etc.

Generally, to make either type of the devices listed above, researchers have relied on lithographic processes originally developed for the semi-conductor industry. In microfluidics, over the last 20-30 years, researchers have used silicon wafers and etched their designs by wet or dry etching, like deep-reactive ion ethcing (DRIE), to construct molds, soft ligthography (SU-8), and in some larger feature size cases micro-milling of aluminum molds. These molds must be created in a clean-room environment, are cost-prohibitive, and take long periods of time to create. In the case of milled metals—the limits of tolerances cannot be lower than the grain-boundary size (typically 50-200 um) and because of random orientation of these grains—the metal cannot keep tolerances to preferred 1 um or lower surface roughness.

Once a mold is created, a polymer like PDMS is poured onto the mold, allowed to harden, and then removed to create layers. Each layer is assembled, usually by manual hand methods, into chips via plasma bonding, and holes are placed in the chip via small punches (biopsy punches). Through these holes, liquid samples are run inside the chips to ID targets, separate rare populations of cells for culturing, or even run genomic profiles.

This process is well documented in peer reviewed articles and a reference with additional reviews can be found here.[6]

[6] Friend, J., & Yeo, L. (2010). Fabrication of microfluidic devices using polydimethylsiloxane. *Biomicrofluidics*, 4(2), 026502. http://doi.org/10.1063/1.3259624

To develop these devices by 3D printing, researchers would require pixels in the range of around 200 nm-100 um. As referenced above, most DLP projectors hit a lower limit around 50 um in pixel pitch as projected on the screen. This results in channels in excess of 150-250 um a priori from references to one of ordinary skill in the art, making the process unusable for microfluidics at a large range of functional requirements. Some manufacturers have gone as far as placing an additional lens directly on top of the final optic outside of the projectors. However, this does not accomplish the intended result of shrinking pixels to a suitable range, and it introduces skewing to the image on the projected screen. Again, this results in failed prints and unusable devices.

While optics exist which can be fit to a DLP and separate light source, these parts must be purchased separately and assembled by an expert, and generally result in a very expensive printer (e.g., Digital Light Innovations, EKB Technologies, and others are examples). They require special coding to control the projector, special electrical wiring, and custom ancillary mechanics, which must be supplied and programed by the user. Another alternative produces the above device and may be assembled into a single unit; for example visitech sells several kits, https://visitech.no/. However, again, it is expensive (e.g., $50,000+), it only permits a single pixel pitch, and it requires other technical specialization, which makes it an unacceptable solution to the above problems. Even if someone were to want to construct their own device, the entry cost of DMDs (digital micromirror device) of suitable pixel count begin at the same price or more compared to a projector (e.g., Texas Instruments). It would be advantageous to be able to use an off the shelf projector with an adjustment method to achieve the desired results explained above and herein.

From the above examples, it can readily be seen that improvements in this area are preferable.

SUMMARY OF THE INVENTION

The present invention addresses the above-described deficiencies, as well as other deficiencies associated with the prior art. In an aspect of the present invention, an optical suspension system is provided, which is disposed between (a) the mount on currently available projectors for the optics and (b) the final optics/lenses. In particular, the system may comprise a spacer, a set of springs or operable stand-offs, and/or a fastening system, which can change, modulate, or adjust the distance between the optics set and the DMD projection set.

Based on the assembly described herein, the distance between the original optics on the projector and the mount may be altered to change the final projection on the vat and surface to be polymerized. This, in essence, may alter the pixel pitch at this interface. In this case, the farther the optics are from the DMD, the smaller the projected area on the vat and surface to be polymerized, resulting in a smaller pixel pitch.

The limits of how small the pixels are is a function of the wavelength of light. Based on light theory and physics, the smallest pixel per specific wavelength will be half of the wavelength of the light source. For example, for a 405 nm light source, the smallest projected pixel will be 202.5 nm in pitch, whereas for a 365 nm source, the smallest projected pixel will be 182.5 nm. If the pixel pitch is adjusted below half the wavelength of light, that segment will be cut off. Thus, at 182.5 nm, only light from a 365 nm source and smaller will be transmitted to the vat.

The adjustment of individual stand-off length can eliminate the off-planar skews associated with many projectors. According to currently available systems, an electronic "keystone" is used to alter the width of any one side of the projector. This is not optimal because it is an artificial effect, a software algo, and not a mechanical one.

Another modification according to the present invention for optic offset may also be fit to the system taught herein, which would allow the optics to be moved in-plane to center them over the DMD. This would serve to eliminate additional stray skewing which has been noted in several prior art projectors. This can eliminate barrel distortion as in many projectors the optics may not be properly centered over the DMD.

Additionally, conditioning filter(s) which convert the available light exiting the optics may be added before the final conditioning set of lenses, which would aid and control the light which is incident to the vat, for example color wheels, hot mirrors to eliminate certain bands of light, or polarization lenses. This aids with critical penetration and polymerization distances within the vat which are needed to control the precise layering within the model being created. Moreover, UV light is easily scatterable and can be difficult to focus if conditioning elements are placed after the final focus lenses. As the filters are added before the final focal lenses according the present invention, this detriment is eliminated.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

These as well as other features of the present invention will become more apparent upon reference to the drawings wherein:

FIG. 13 shows depictions according to embodiments of the current invention illustrating a 10 um resolution from a standard projector.

DETAILED DESCRIPTION

Figure 1:
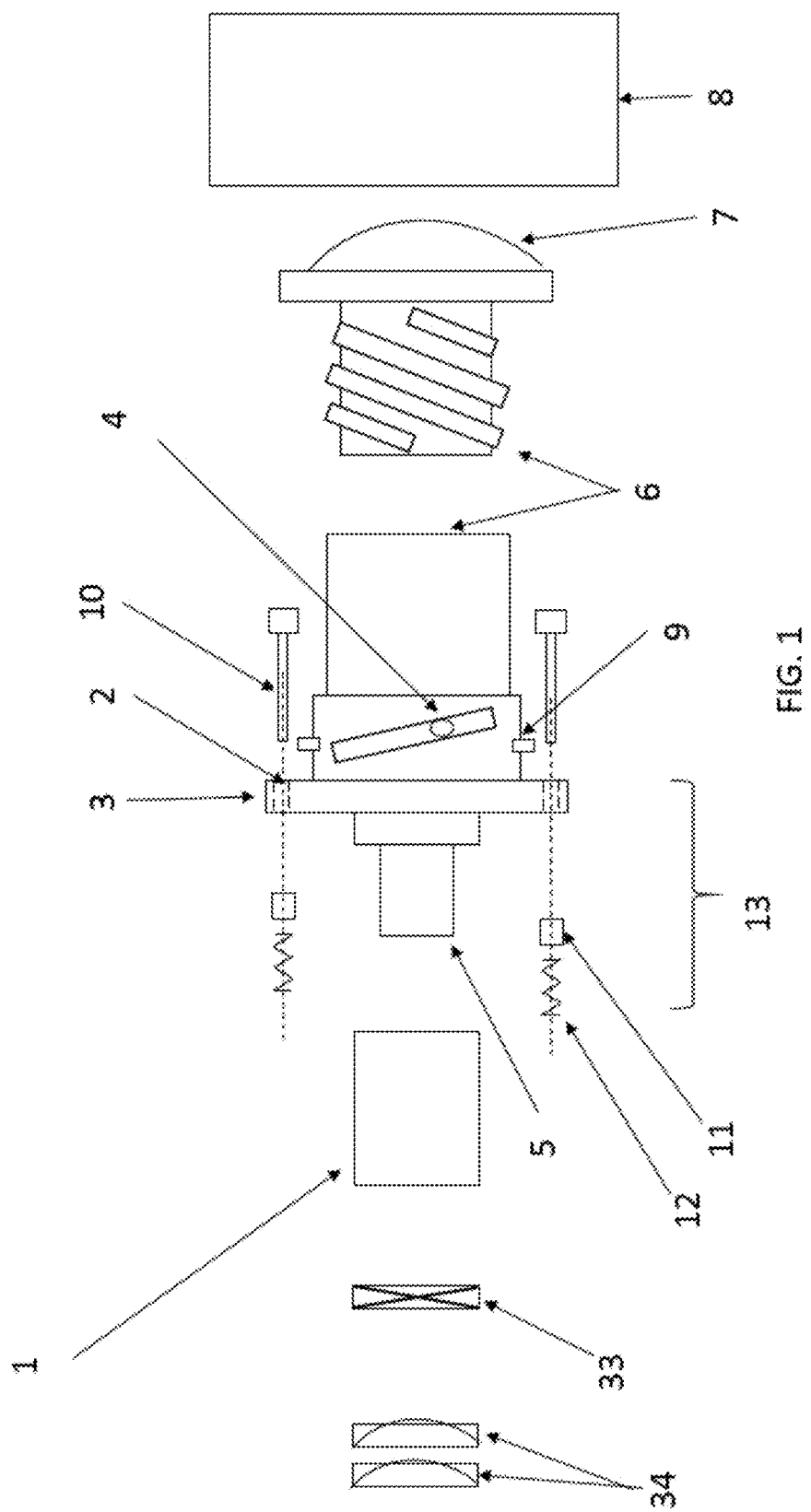
FIG. 1 shows a schematic drawing of one possible embodiment of the current invention; namely, an exploded view of the optics, suspension system, and mounting bracket on the projector.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention. All references cited in this specification are hereby incorporated by reference in their entireties.

According to the present invention, in aspects, a suspension system is provided comprising the following components. An extension for light collecting (1) is mounted to the rear of the optics; in this embodiment, it is 3D printed of polymers having a high enough melt temperature to survive extended print times. In aspects, the extension may include metal(s), ceramic(s), or other materials to affect the properties of the extension. A function of this aspect of the system is to collect light from the correct distance of the DMD and eliminate light bleeding around the now extended system as it is moved forward. In aspects, and as shown in FIG. 1, attached to the rear of this collector or in between it and the original optic mount, an iris (33) or other conditioning filters (34) may be provided to further alter the light amount, eliminate light between layer exposure, etc.

A mounting location (2) is either positioned in close proximity to a projection system or contains a projection system (for example, but not limited to: Digital Micro-Mirror Device (DMD), LCD Screen, or Laser galvanometer). In the preferred embodiment, original mounting holes from the optic carrier are re-used.

Additionally, a mechanism of attachment (10) is provided, which links the final optic(s) (13), final optic (7), focus knurled cover (8), and the mounting location (2), such as, but not limited to, two or more screws (10), screws with springs (10, 12), stand-off spacers (11), pistons, linear actuating devices, CNC controlled actuators, stepper motors, etc., as illustrated and further described in FIGS. 1, 2, 3, and 6. The size adjustment for the projection area (4) and focus wheel attachments (9) can be used for their normal functions. Additionally, focus screw segments (6) as part of the original product, in aspects, are still able to be used in the system (see FIG. 1).

The original set of optics (5, 7, 8, 9, 13) in FIG. 1 can now be re-installed on the original projector with no alterations to the projector or the original mounts. Because the original mounts and optics may be used, no significant alterations are required other than focusing the lens and setting the proper stand-off distance. The lens tilt-to-axis of projection may be controlled via varying the screw head distance from the DMD housing. Over-tightening one screw and not the others may lead to the keystone effect. By having three or more screws, the entire plane of the lens can be tuned to normal against the projection axis. As the springs are installed between the DMD and the housing, the tension keeps the optics in the proper location regardless of projector mounting orientation. The more the screws are loosened, or the further the optic set is from the housing, the smaller the pixel pitch will be—down to the limit of the optics or physical limit of light (i.e., ½ wavelength).

Figure 1A:
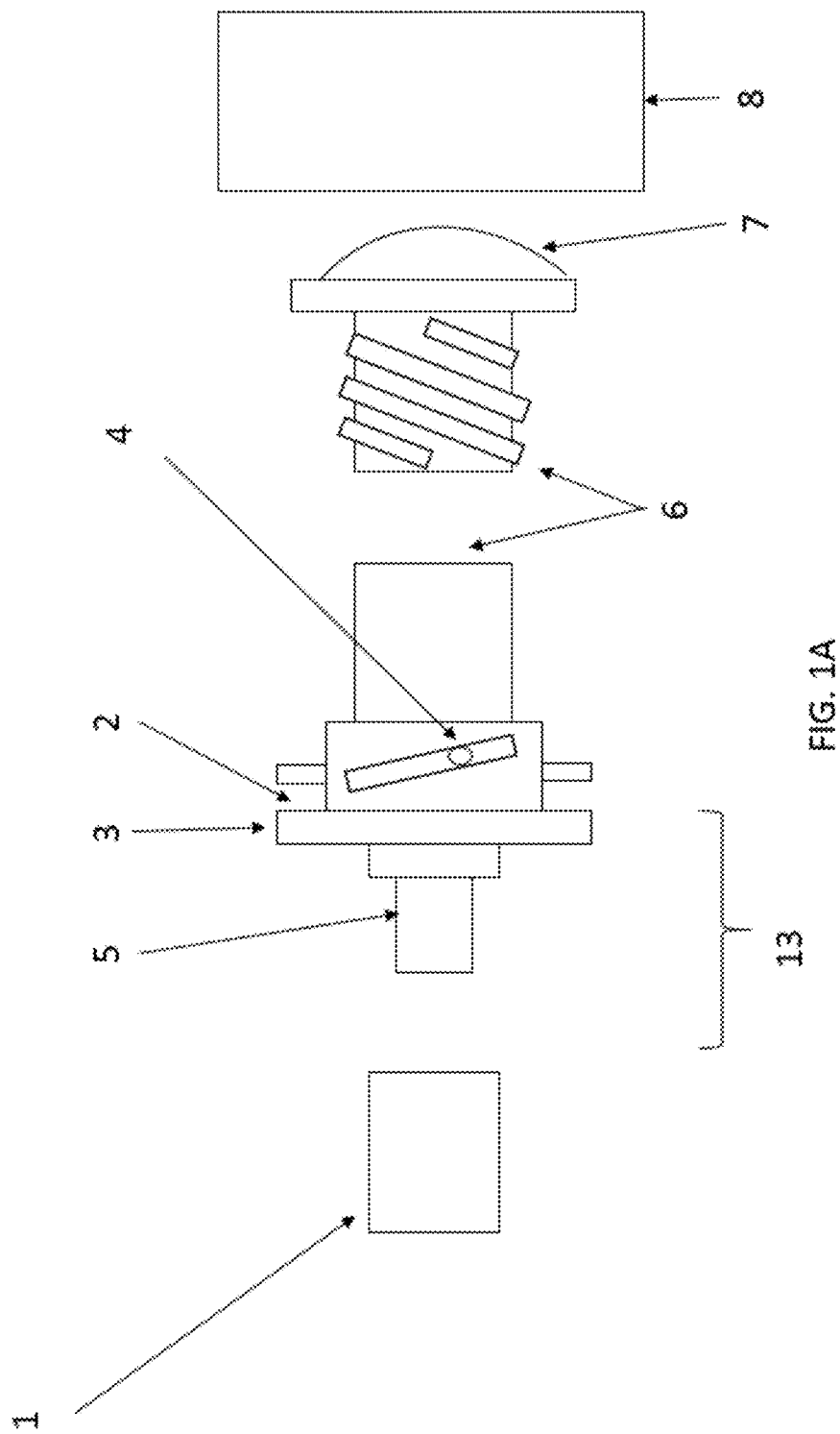
FIG. 1A shows a schematic drawing of one possible embodiment of the current invention; namely, a side view of the exploded assembly of FIG. 1, with rear shield (1).

Turning now to additional figures, FIG. 1A shows a side view of the optical assembly with rear mounted sight shield (1) to reduce and eliminate stray light—as the optics are further from the DMD, a shield needs to be installed to eliminate diffuse light from coming back into areas where pixels are turned off. FIG. 1A shows a rear optic mount (3) with screw holes at location (2) (also illustrated in FIG. 1 and FIG. 2) to attach to a DMD. The zoom functions (4 and/or 9) and mounts can be used as shown. The front optic (7) can be re-installed via the threaded sections of the original optic carrier (6). Finally, the knurled knob (8) can be reattached to the optic.

In aspects, the threaded sections (6) may be hollow screws and in aspects telescoping hollow screws where one screw can be threaded within another screw or screws. In aspects, a lowest screw fits inside a middle threaded section, which fits into a final threaded section, although more or less telescoping hollow screws may be used. In aspects the threaded screws may be nested inside one another in a telescoping assembly. This configuration could be repeated any number of times to allow pixel adjustment by incremental steps or turns of the final section. In this manner, the projector can use optics from a factory in the same compact footprint, as would be understood by one skilled in the art. This allows the projector the ability to move from 2 mm pixel size to 0.1 um, by way of exampyl only.

Figure 2:
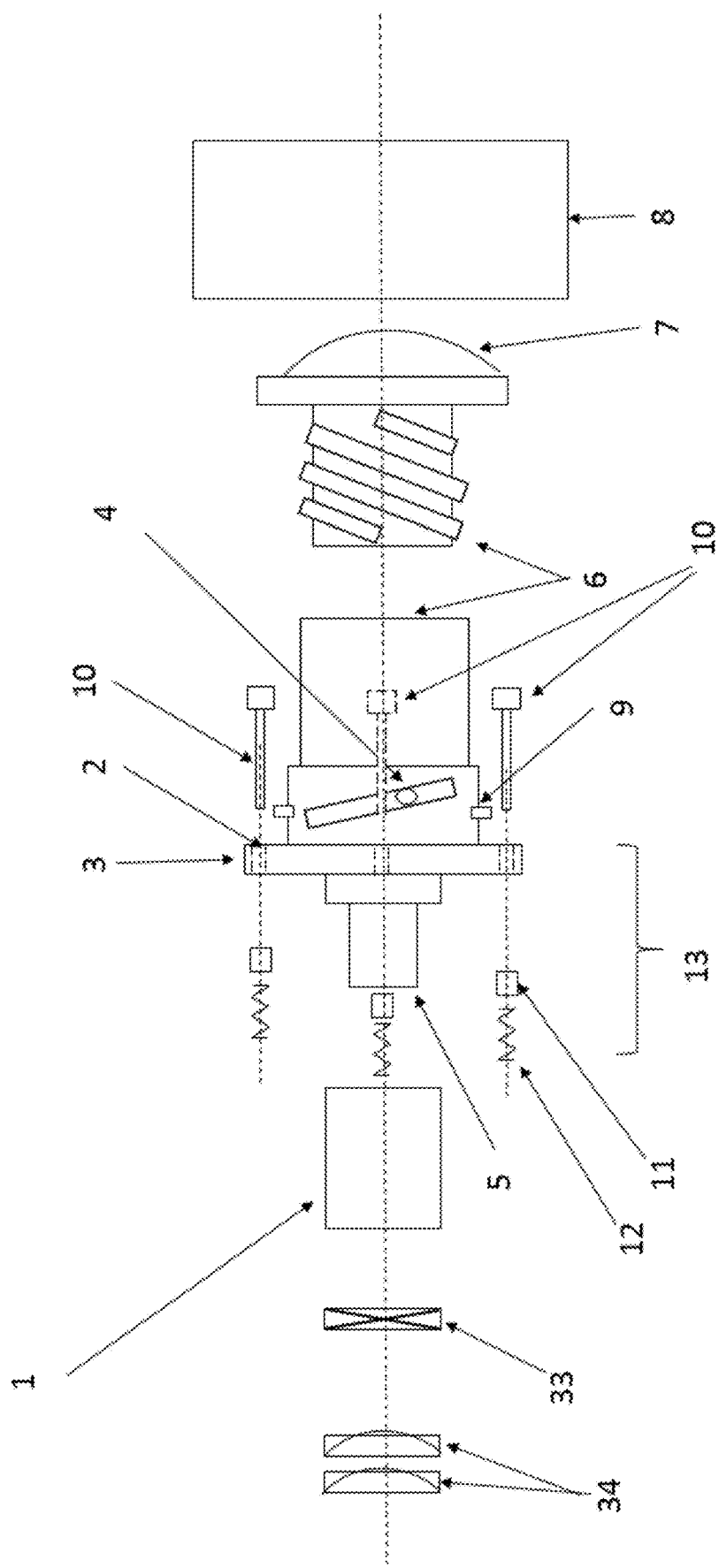
FIG. 2 shows a schematic drawing of one possible embodiment of the current invention; namely, an assembly view of the suspension system with iris and pre-conditioning filters.

FIG. 2 shows an exploded view with rear optic shield (1), screws (10) which pass through the mounting holes (2), and stand-offs (11) with springs (12), which are tensioned to provide support for the optic such that it remains stable in any configuration.

Figure 3:
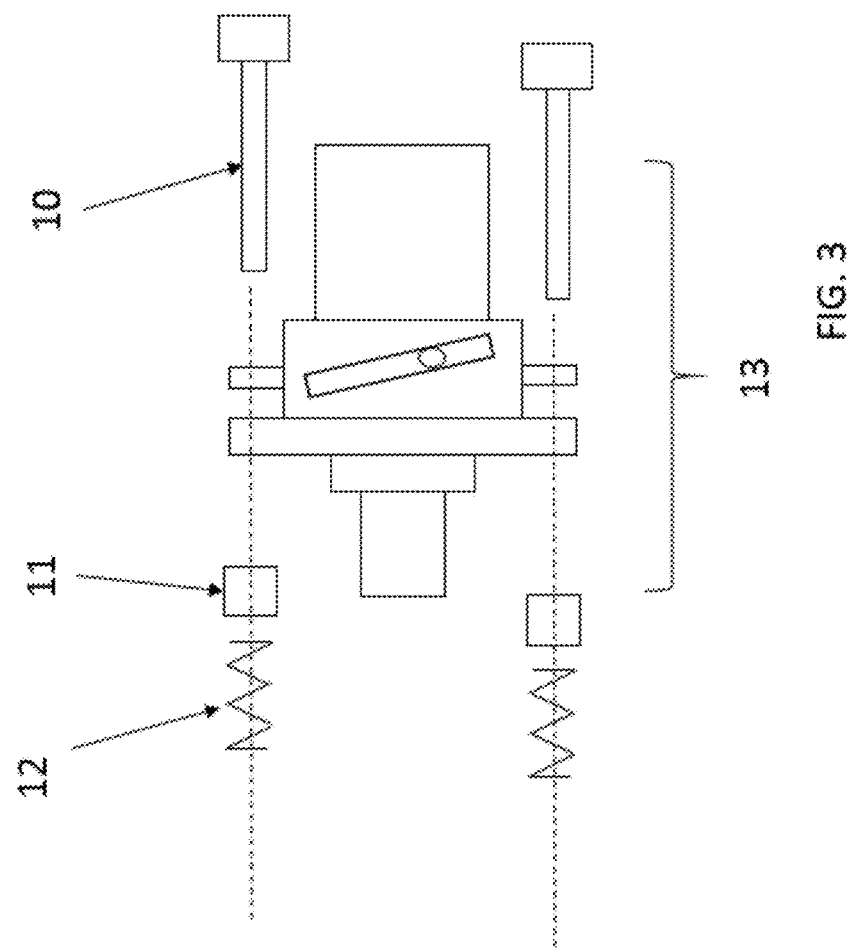
FIG. 3 shows a schematic drawing of one possible embodiment of the current invention; namely, a side perspective of the suspension system.

FIG. 3 shows a side view of the rear optic housing assembly (13), screws (10), stand-offs (11), and springs (12).

Figure 4:
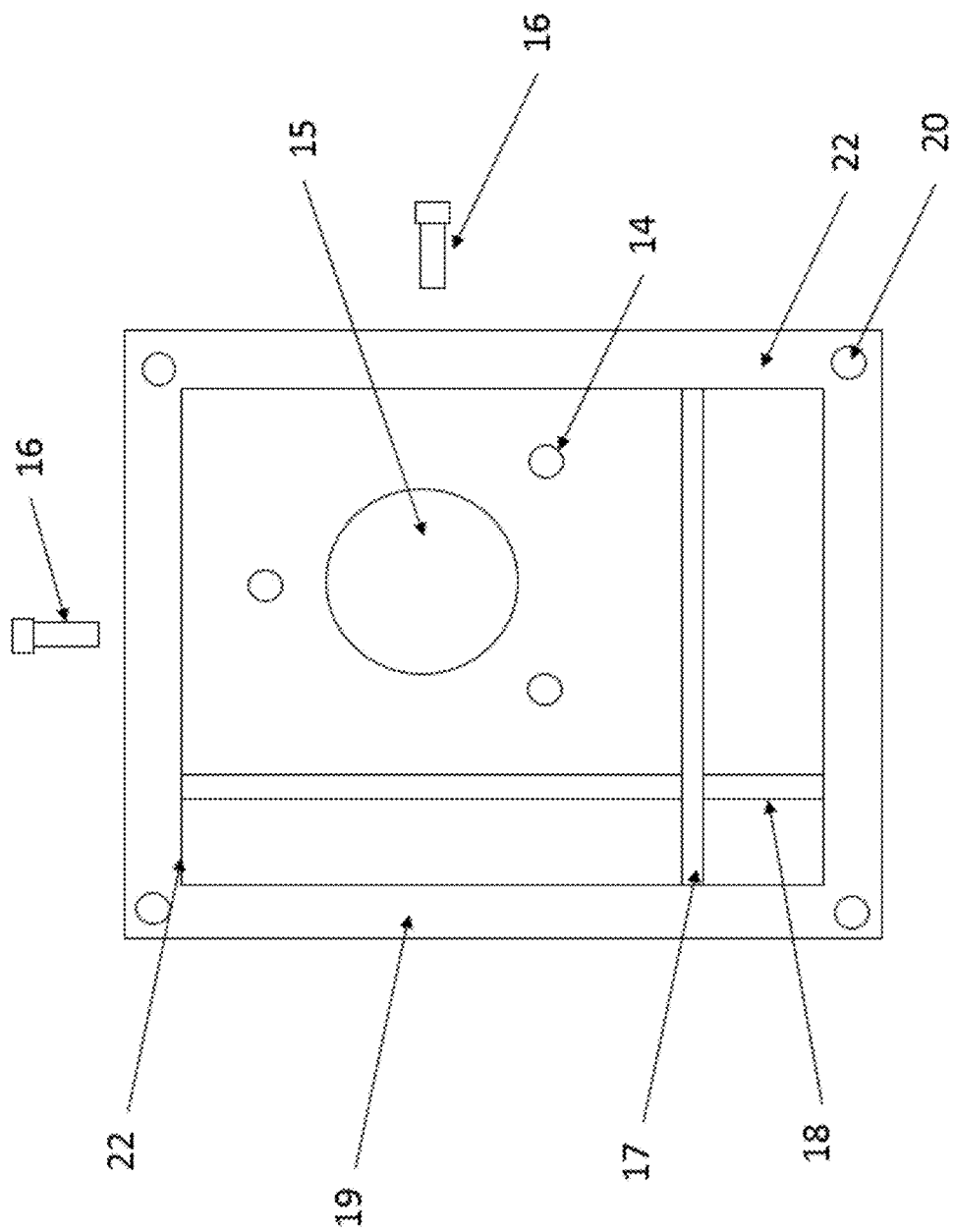
FIG. 4 shows a schematic drawing of one possible embodiment of the current invention; namely, an adjustment gantry for optic centering over beam.

FIG. 4 illustrates the optical centering jig. Screws (16) adjust the xy position of the optic set while keeping it in-plane with the DMD. Again, any misalignment along the axis of projection can be rectified via the housing screws. This section is now attached to the housing block (15) via screw locations (14). Linear slides like a v-block or other mechanism (17, 18, 21, 22) allow the translation of the optic position. The rear optic shield passes through the large center hole on the mounting block (15).

Figure 5:
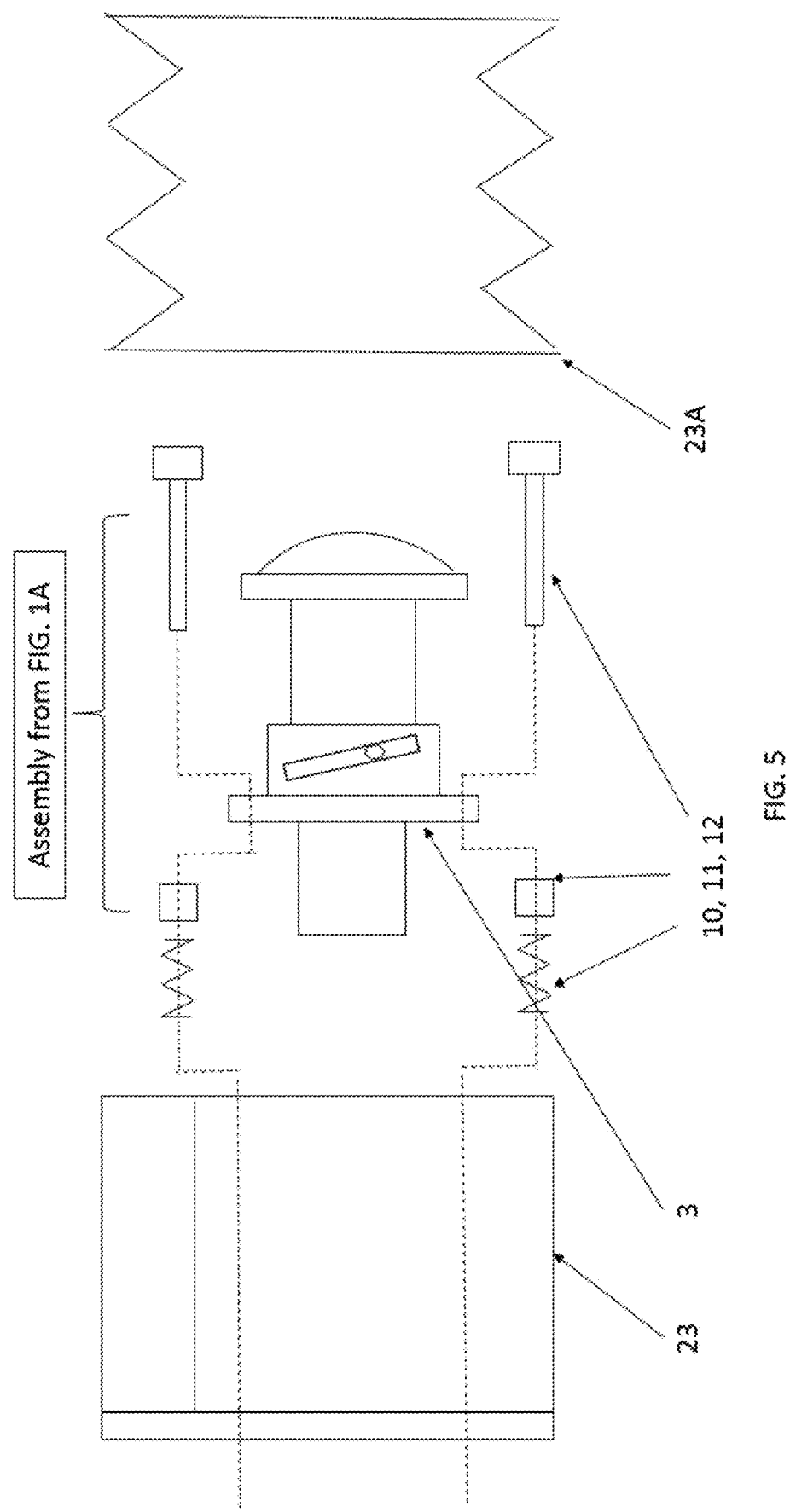
FIG. 5 shows a schematic drawing of one possible embodiment of the current invention; namely, an optional DMD cowl or flexible seal.

FIG. 5 illustrates two ways according to the present invention (23 and 23a) regarding sealing the optic to the DMD. Option (23) is a rigid mounting shield which is placed on the DMD housing, and the rear optic housing slides inside this opening during mounting. A flexible accordion style seal can also be installed as shown in option (23a). This serves to keep dust and contaminants from the DMD; contaminants can cause dust particle translation onto the print and thereby alter the results or severly limit projector lifetime.

Figure 6:
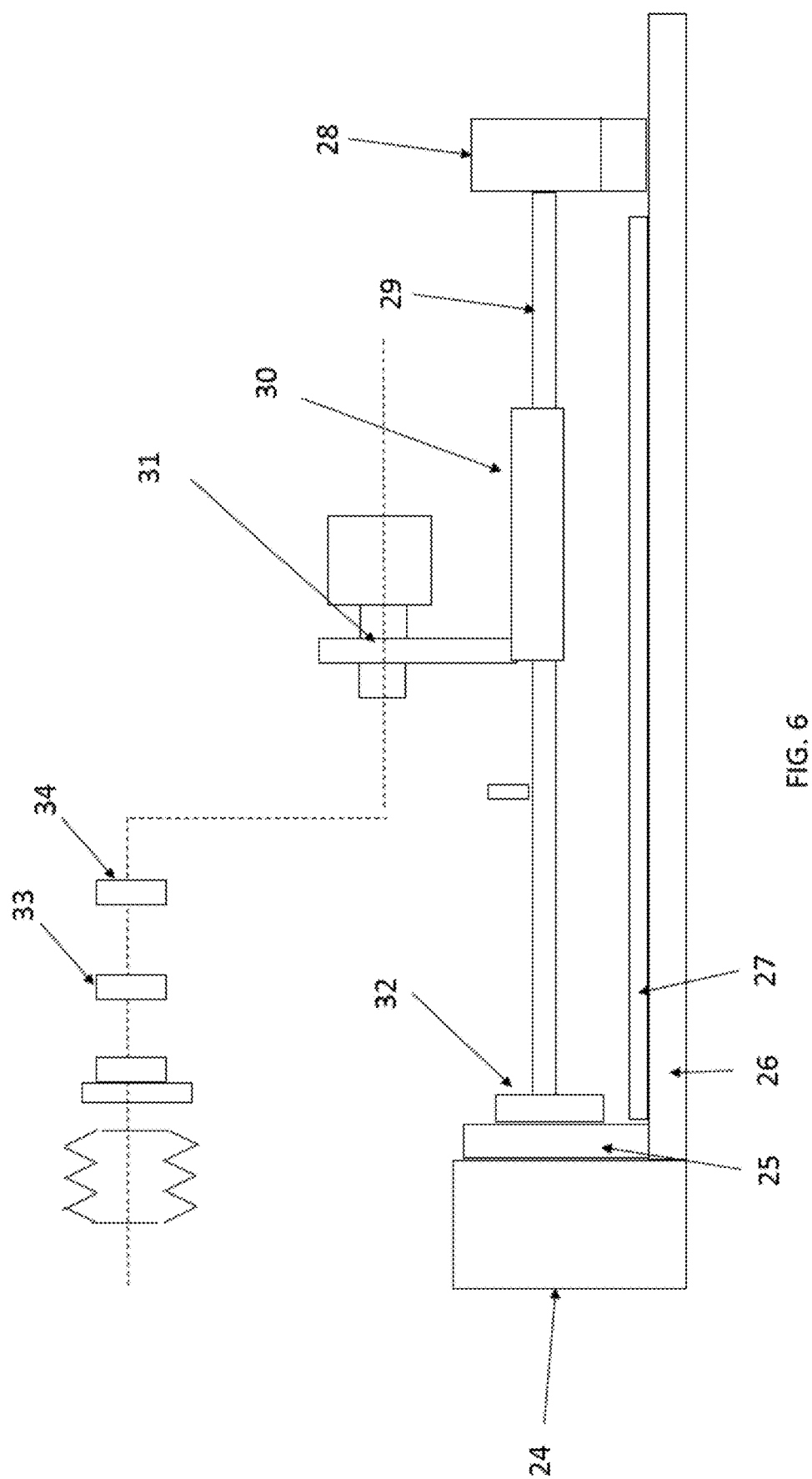
FIG. 6 shows a schematic drawing of one possible embodiment of the current invention; namely, an adjustable track with motor to alter optics remotely.

FIG. 6, FIG. 1, and FIG. 2 show an iris (33), which can be activated between exposures to further improve prints by completely eliminating light by mechanical activation rather than inconsistent light blocking via software, and conditioning filters (34) like hot mirrors, multichannel plates, further lenses for focusing, etc. These may be placed in any order behind the rear optic and in front of the DMD. Also in FIG. 6, the automated set-up to remotely control the pixel pitch is depicted. The DMD (24) is attached to the system via mounting screws and a bearing (32) supports one end of the lead screw (29) while the linear bearing slide (30), which is attached to the optics in entirety, can be moved toward or away from the DMD via activating the motor (28).

The invention described herein allows a standard projector (e.g., off the shelf DLP projector) with a DMD enclosed (e.g., VGA, XGA, WVGA, HD, 4K, etc.) to be retrofitted to reduce the minimum allowable pixel pitch. It resolves problems of, for example:

Planarity between lenses and the DMD—Projectors have an offset because the outer housing of the DMDs are cast and do not level the injection molded lens carrier to be at the correct angle axis. While there may be small machining marks on the mount plate, in an effort to level the optics against the light projectoin axis, a thin layer of sealant, foam or other sealing mechanism may be included or used to keep dust from entering the DMD, which would reduce its lifetime and/or prevent alignment accuracy.

Resolutions below 30 um—The current invention allows pixel pitches down to theoretical limits for light penetration (0.5 the wavelength of light wavelength; for example, a 405 nm would have a limit of 202.5 nm before cut out of light). Beyond this limit, a 2 photon strategy would be required for polymerization. Current projectors list their minimum "resolution" as the smallest pixel pitch attainable by optics mounted to the projector. The smallest resolution currently found by standard projectors for DIY is between 27 and 30 um. However, this resolution is actually not the smallest print artifact; the smallest structure that may be printed is a function of resin, light spectrum, filters, and time for which the light is on—known as "dosing".

Increased range of pixel pitches—According to the present invention, a long telescoping focus allows range of pixel pitches from 0.5 wavelength to infinite pixel sizes.

Control over pitch angle of lens—According to the present invention, screws or other attachments provide the ability to finitely control pitch angle of lens to DMD, and a sealing portion is provided to keep dust and other contaminants from the DMD.

Adjustment and correction for off-plane focus—The current invention allows adjustable focal range from, for example, 0.5-100 um (it is not a static range). For each pixel pitch there is a designated distance from DMD to lens (2) and designated focal distance from lens (1-2) and designated focal distance from final lens (1) to substrate.

In embodiments, the system may include optics which are suspended from a solid body, such as the enclosure for a DMD mirror by a set of fasteners—for example screws with springs—enabling adjustment of the distance between the optics and projector housing. Additionally, the system may have the closest optic, or optical set (as in the case of paired and multiple optics in a set such as single, double, triple, aspheric, fresnel, etc, brought closer to the solid body in a controlled manner by small incremental steps, such as adjusting a screw, piston distance, stepper-motor, or other mechanism. In a preferred embodiment, the minimum pixel pitch is 0.1 um with maximal pitch at 2 mm.

The orientation between the optics and the projected plane may be adjusted between any combination of the following:
- 0 degrees along the z axis, increasing or decreasing the distance between the optics and projected image;
- Spatially along the xy plane to the image projected, as in centering the optics over the projected image; and/or
- Allowing up to 45 degrees tilt to the z axis in the xy plane, allowing tilt in any direction to reduce, eliminate, or enhance keystone effects.

The system may comprise: (a) optical conditioners such as, but not restricted to, filters, optical plates, optical gates, and/or microchannel plates, and (b) lenses made of materials such as but not limited to PMMA, Borosilicate Glass of varying thicknesses, collimators which enhance or restrict light parallelism entering/exiting the optics, and/or other optical conditioners may be introduced between the projector body and first optic or optics carrier.

The system may further comprise a light shield placed on the rear of the optic on the closest side to the DMD, a light shield mounted to the projection housing, location, or mounts, and/or a light shield mounted between the projection location and the first optic.

Figure 7:
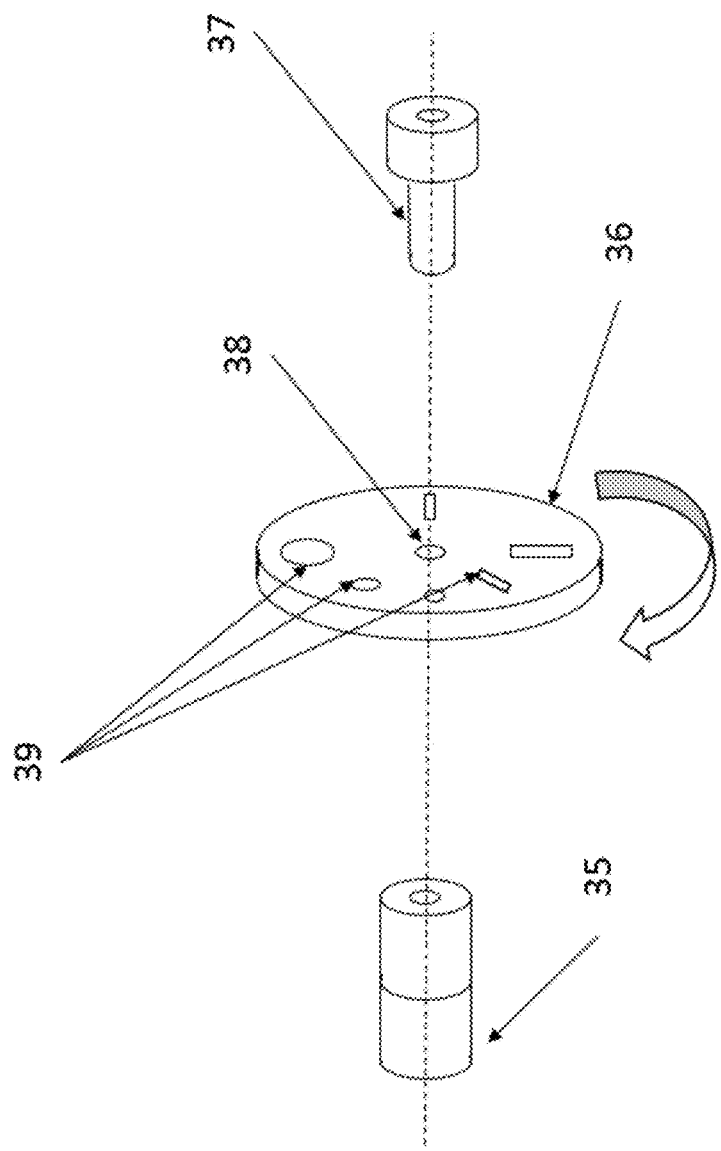
FIG. 7 shows a rotatable disc with truncating slot/holes slits and other geometries used to reduce a laser spot size at point of impact to the resin/vat.

FIG. 7 illustrates two ways according to the present invention to design a rotating light shield/splitter/slit for controlling or shunting laser spot size. This system can be installed on a gantry based system where the laser (35) is mounted to a system capable of translation across the XY plane. By rotating the disc (36) which is mounted using an attachment method (37) around the central hole (38), different slots or holes can be used to trim the laser spot size at point of impact on the layer to be polymerized.[7] In this way a single laser can be used to create a variety of line traces and polymerize a layer at a faster rate than a standard set up like those FORM LABS (galvanometric) or mUVe3D (XY-Gantry) employ.

[7] https://web.archive.org/web/*/http://vlab.amrita.edu/?sub=1&brch=189&sim=342&cnt=1

Figure 8:
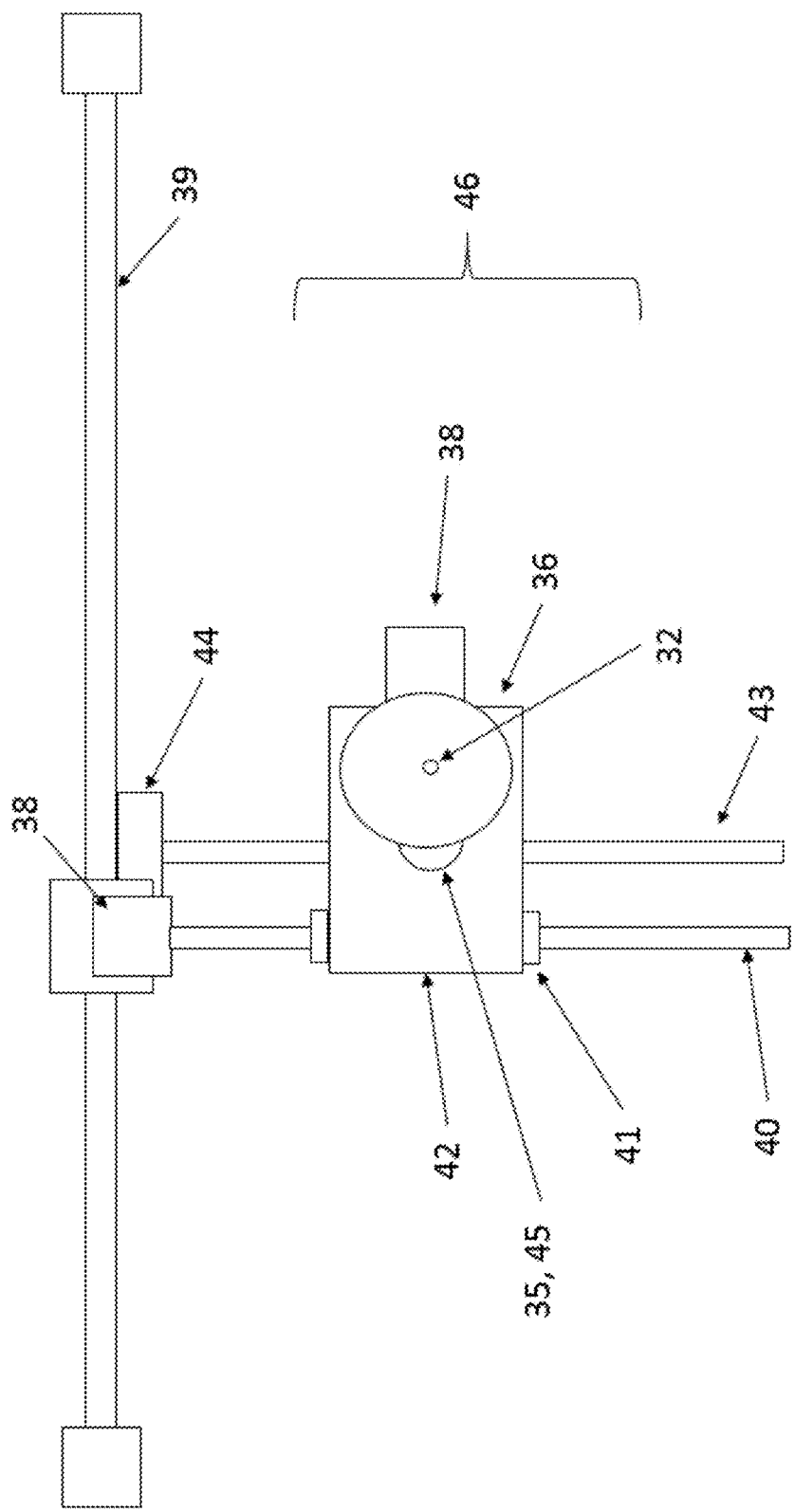
FIG. 8 shows an XY gantry with laser diode and truncating plate installed for use in a SLA based system.

FIG. 8 shows the laser (35) mounted to a clamp (42), with a screw axis bearing (41) and lead screw (40), the travel which is controlled by a stepper motor (38) along an axis. The laser travel and positioning can be aided by a slide bar, linear bearing, track or other mechanism/structure (43) also mounted to a carrier (44) on one side of the axis. The laser (35) and attached optics (45) can be truncated nearly instantly by using the slotted disc, which is attached via an axial member (37) to a stepper motor (38) or other control mechanism. The motor is controlled by programming to select the proper location for each hole or slot. The subsystem (46) comprised of the disc (36), axis (37) stepper motor (38), laser (35), and mount (42) can of course be installed in a galvanometric system prior to the mirrors and used without needing the gantry and instead using mirrors to direct the laser to polymerize each layer.

Figure 9:
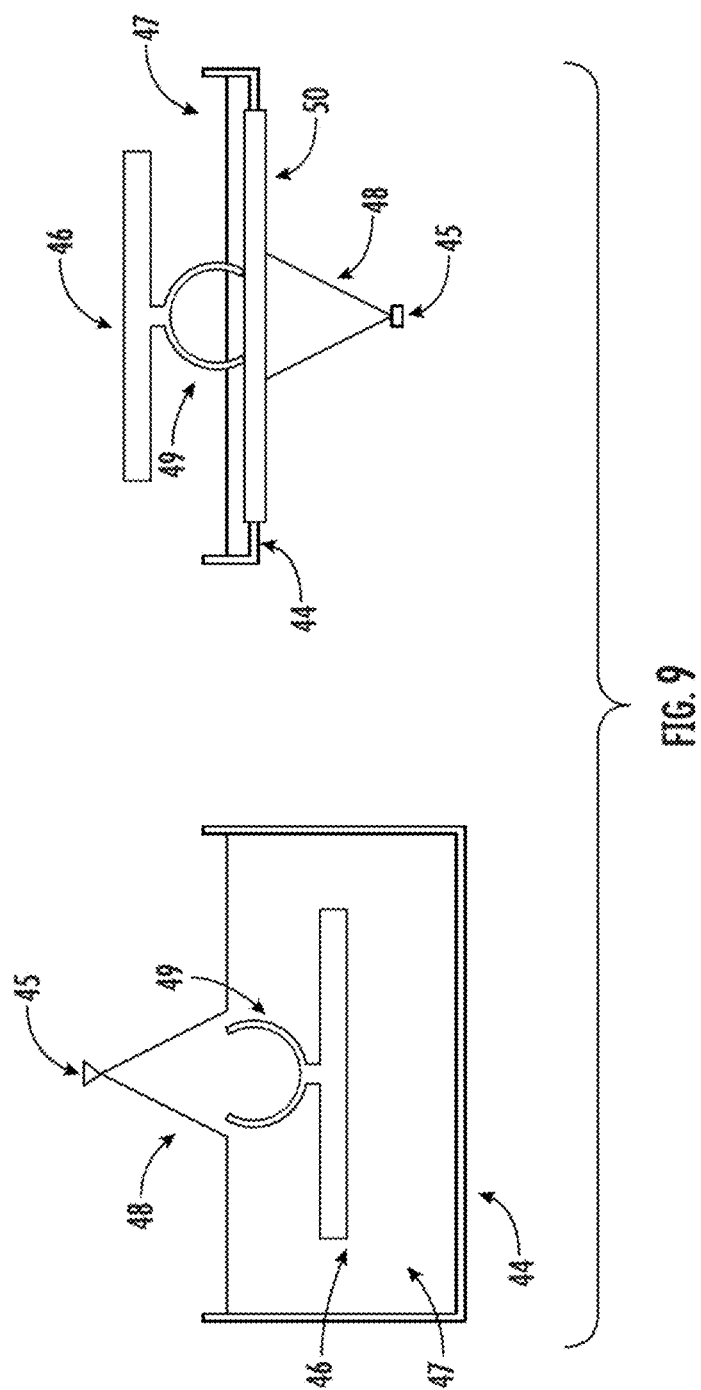
FIG. 9 shows a schematic drawing of two possible embodiments of the current invention; namely, a top-down uDLP/SLA system (a) and a bottom-up DLP/SLA system (b).
Figure 10:
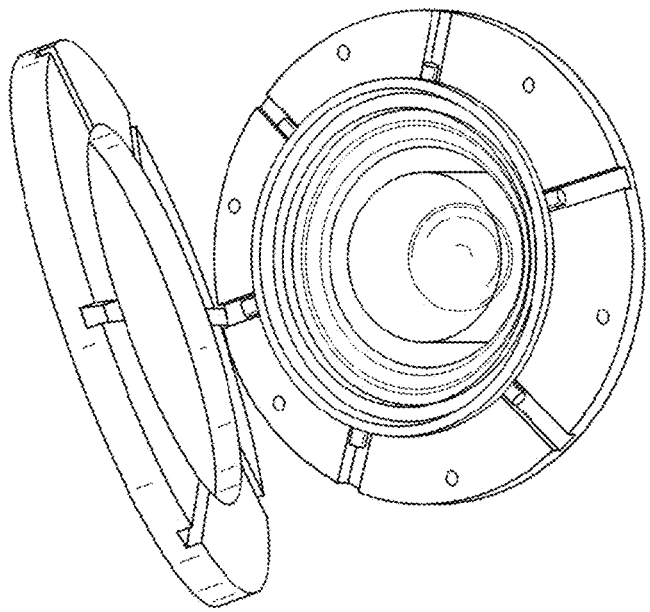
FIG. 10 shows a depiction according to embodiments of the current invention of an assembly of an outer lens attachment for the suspension system.
Figure 11:
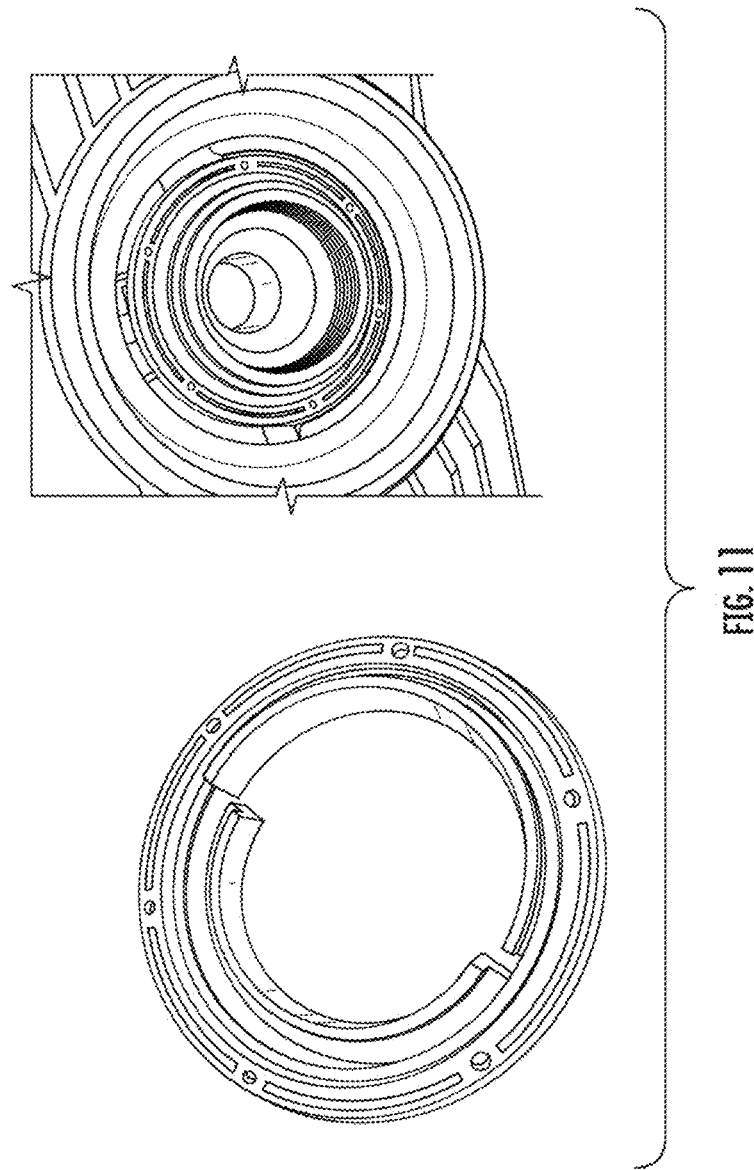
FIG. 11 shows depictions according to embodiments of the current invention of a split ring design, used for rear-mount to a projector lens assembly on a projector. The depictions show the assembly and upon installation.
Figure 12:
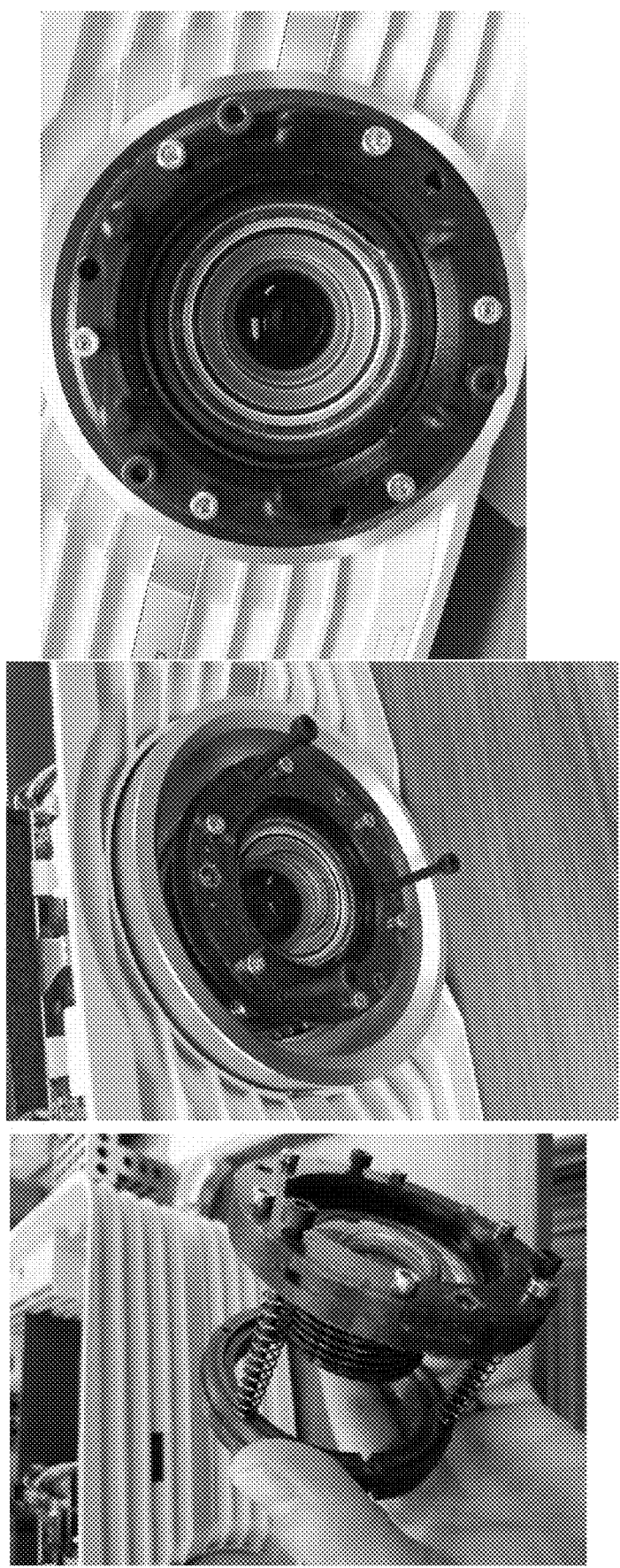
FIG. 12 shows depictions according to embodiments of the current invention of a suspension system assembled outside of a projector, along with a dry-fit and a final fit to allow focal adjustment from 0.1 um to 200 mm.
Figure 14:
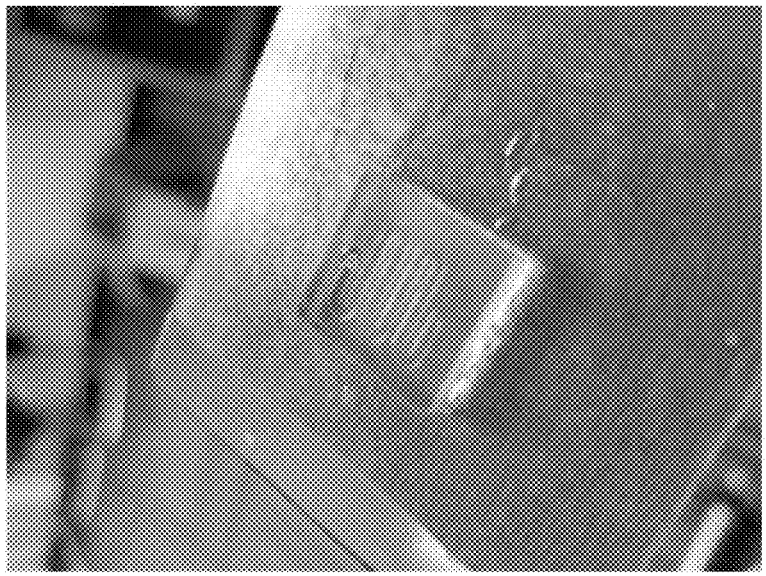
FIG. 14 shows a depiction according to embodiments of the current invention of an example chip that is an open top device, printed at 10 um resolution, 0.5 um via through 1.3 mm height device, with 50 um channel height.
Figure 15:
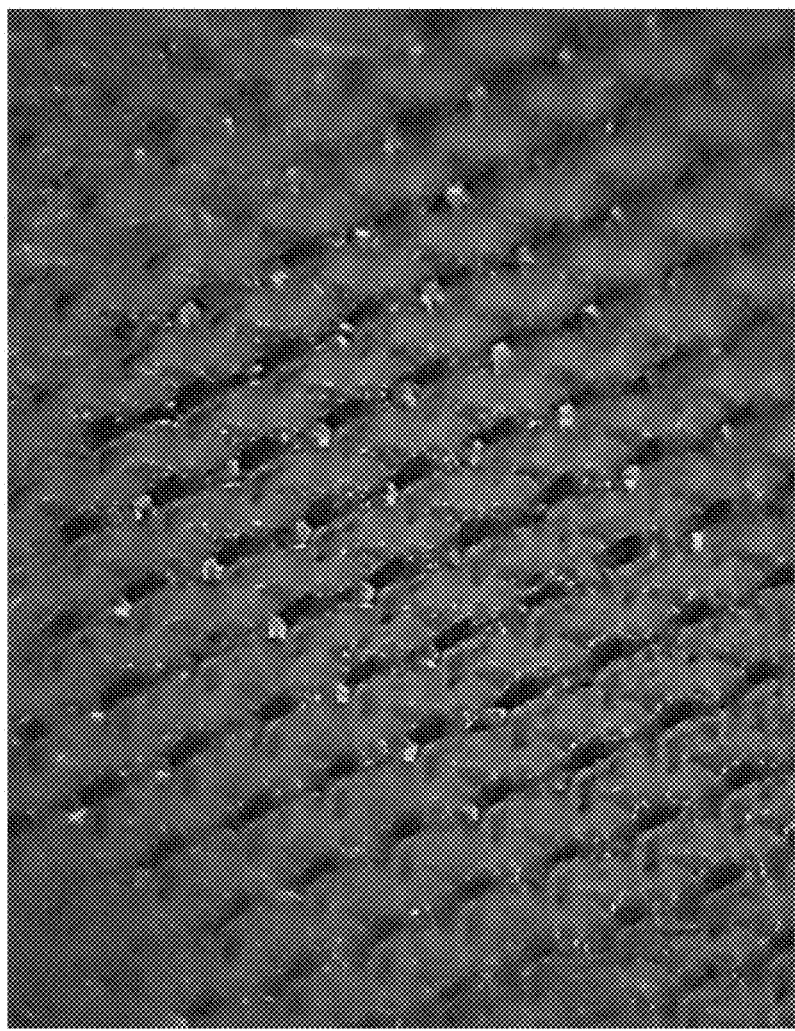
FIG. 15 shows a depiction according to embodiments of the current invention of an example section from a non-capped 3D printed microfluidic device, 20 um pillars×200 um tall, offset at 10 um 80 um spacing—printed in 4× exposure without moving stage.

FIG. 9 shows an LCD system, where there is no focal lens. For example, a set of optics may be installed for subsequent light capture/direction. The vat is moved to rest directly upon the location suitable for the chosen opitcs.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A suspension system comprising:
   a. a mounting apparatus positioned in proximity to a projection system, or containing a projection system, wherein the projection system comprises one or more of a Digital Micro-Mirror Device, a Liquid Crystal Display Screen, and/or a Laser galvanometer;
   b. an optic or optics comprising one or more lenses; and
   c. an attachment mechanism linking the optic or optics and the mounting apparatus, wherein the attachment mechanism comprises one or more of a screw, a hollow or telescoping screw with or without a spring or springs, a piston or hollow piston, a linear actuating device, a computer-numerically-controlled (CNC) actuator, and/or a stepper motor;
   d. wherein the system is capable of being used in association with three-dimensional printing or additive manufacturing; and
   e. wherein a minimum pixel pitch formed by the suspension system is from 0.1 um to 2 mm.

2. The suspension system of claim 1, wherein the optic or optics are suspended from a solid body, and wherein the optic or optics are connected to the solid body by adjustable fasteners, which are capable of allowing an adjustment of a distance between the optic or optics and the solid body.

3. The suspension system of claim 2, wherein the optic or optics is capable of being moved closer to or farther from the solid body either continuously or by incremental steps.

4. The suspension system of claim 1, further comprising one or more optical conditioner and/or filters.

5. The suspension system of claim 4, wherein the one or more optical conditioner comprises one or more of a bandpass filter, an optical plate, and optical gate, a microchannel plate, a lens, and/or a collimator.

6. The suspension system of claim 4, wherein the one or more optical conditioner is placed between a projector body and the optic or optics, or between an optical carrier, between lenses, or between lenses and a vat projection.

7. The suspension system of claim 6, wherein the lenses comprise one or more of poly-methyl-methacrylate (PMMA), Borosilicate Glass, and/or other optically clear solid, wherein the PMMA or Borosilicate Glass is optically clear, optically semi-clear, or optically programmed.

8. The suspension system of claim 1, wherein one or more filters or one or more optical conditioners are capable of being introduced or located between a light source and the optic or optics.

9. The suspension system of claim 1, further comprising an optic mount for holding the optic or optics, wherein the optic mount is adjustably attached to the Digital Micro-Mirror Device or a Digital Micro-Mirror Device housing using one or more screws or other attachment mechanisms.

10. A suspension system comprising:
   a. a mounting apparatus positioned in proximity to a projection system, or containing a projection system, wherein the projection system comprises one or more of a Digital Micro-Mirror Device, a Liquid Crystal Display Screen, and/or a Laser galvanometer;
   b. an optic or optics comprising one or more lenses; and
   c. an attachment mechanism linking the optic or optics and the mounting apparatus, wherein the attachment mechanism comprises one or more of a screw, a hollow or telescoping screw with or without a spring or springs, a piston or hollow piston, a linear actuating device, a computer-numerically-controlled (CNC) actuator, and/or a stepper motor;
   d. wherein the system is capable of being used in association with three-dimensional printing or additive manufacturing; and
   e. wherein an orientation between the optic or optics and a projected plane is capable of being adjusted to one or more of the following positions:
      (i) 0 degrees along a z axis, and allowing for increasing or decreasing a distance between the optic or optics and a projected image and the Digital Micro-Mirror Device, thereby being capable of changing the focal plane and pixel sizes to limits of ultraviolet light;
      (ii) Spatially along an x-y plane in relation to a projected image, including centering the optic or optics over the projected image; and/or
      (iii) A 45 degrees or less tilt to a z axis in an x-y plane, allowing a tilt in any direction to cause, reduce, eliminate, or enhance a keystone effect(s).

11. The suspension system of claim 10, wherein the optic or optics are suspended from a solid body, and wherein the optic or optics are connected to the solid body by adjustable fasteners, which are capable of allowing an adjustment of a distance between the optic or optics and the solid body.

12. The suspension system of claim 11, wherein the optic or optics is capable of being moved closer to or farther from the solid body either continuously or by incremental steps.

13. The suspension system of claim 10, further comprising one or more optical conditioner and/or filters.

14. The suspension system of claim 13, wherein the one or more optical conditioner comprises one or more of a band-pass filter, an optical plate, and optical gate, a micro-channel plate, a lens, and/or a collimator.

15. The suspension system of claim 13, wherein the one or more optical conditioner is placed between a projector body and the optic or optics, or between an optical carrier, between lenses, or between lenses and a vat projection.

16. The suspension system of claim 15, wherein the lenses comprise one or more of poly-methyl-methacrylate (PMMA), Borosilicate Glass, and/or other optically clear solid, wherein the PMMA or Borosilicate Glass is optically clear, optically semi-clear, or optically programmed.

17. The suspension system of claim 10, wherein one or more filters or one or more optical conditioners are capable of being introduced or located between a light source and the optic or optics.

18. The suspension system of claim 10, further comprising an optic mount for holding the optic or optics, wherein the optic mount is adjustably attached to the Digital Micro-Mirror Device or a Digital Micro-Mirror Device housing using one or more screws or other attachment mechanisms.

19. A suspension system comprising:
   a. a mounting apparatus positioned in proximity to a projection system, or containing a projection system, wherein the projection system comprises one or more of a Digital Micro-Mirror Device, a Liquid Crystal Display Screen, and/or a Laser galvanometer;
   b. an optic or optics comprising one or more lenses; and
   c. an attachment mechanism linking the optic or optics and the mounting apparatus, wherein the attachment mechanism comprises one or more of a screw, a hollow or telescoping screw with or without a spring or springs, a piston or hollow piston, a linear actuating device, a computer-numerically-controlled (CNC) actuator, and/or a stepper motor;
   d. wherein the system is capable of being used in association with three-dimensional printing or additive manufacturing;
   e. wherein the optic or optics are suspended from a solid body, and wherein the optic or optics are connected to the solid body by adjustable fasteners, which are capable of allowing an adjustment of a distance between the optic or optics and the solid body;
   f. wherein the optic or optics is capable of being moved closer to or farther from the solid body either continuously or by incremental steps;
   g. wherein the optic or optics are capable of being moved closer to or farther from the solid body by an adjustable screw, a piston distance, a stepper-motor, or combinations thereof, before or during the three-dimensional printing or additive manufacturing; and
   f. wherein the pixel pitch formed ranges between about 0.1 um and about 2 mm.

* * * * *